United States Patent [19]

Richter et al.

[11] Patent Number: 4,566,881
[45] Date of Patent: Jan. 28, 1986

[54] PROCESS AND APPARATUS FOR PRODUCING OXYGEN WITH A LOW PROPORTION OF ARGON FROM AIR

[75] Inventors: Ekkehard Richter; Karl Knoblauch, both of Essen; Rolf Schlegel, Gladbeck; Werner Körbächer, Mühlheim, all of Fed. Rep. of Germany

[73] Assignee: Bergwerksverband GmbH, Essen, Fed. Rep. of Germany

[21] Appl. No.: 695,394

[22] Filed: Jan. 28, 1985

[30] Foreign Application Priority Data

Jan. 26, 1984 [DE] Fed. Rep. of Germany ....... 3402533

[51] Int. Cl.$^4$ .............................................. B01D 53/04
[52] U.S. Cl. .......................................... 55/25; 55/58; 55/62; 55/68; 55/75; 55/179; 55/389
[58] Field of Search .................... 55/25, 26, 31, 33, 35, 55/58, 59, 62, 68, 74, 75, 179, 180, 387, 389

[56] References Cited

U.S. PATENT DOCUMENTS

| 3,102,013 | 8/1963 | Skarstrom | 55/62 X |
|---|---|---|---|
| 3,225,516 | 12/1965 | Smith et al. | 55/62 X |
| 3,237,379 | 3/1966 | Kant et al. | 55/62 X |
| 4,013,429 | 3/1977 | Sircar et al. | 55/58 X |
| 4,070,164 | 1/1978 | Miwa et al. | 55/58 X |
| 4,153,428 | 5/1979 | Saunders et al. | 55/26 |
| 4,190,424 | 2/1980 | Armond et al. | 55/58 |
| 4,386,945 | 6/1983 | Gardner | 55/58 X |
| 4,472,178 | 9/1984 | Kumar et al. | 55/28 X |
| 4,519,813 | 5/1985 | Hagiwara et al. | 55/58 X |
| 4,529,412 | 7/1985 | Hayashi et al. | 55/58 X |

FOREIGN PATENT DOCUMENTS

2855626  7/1979  Fed. Rep. of Germany .

Primary Examiner—Robert Spitzer
Attorney, Agent, or Firm—Karl F. Ross; Herbert Dubno

[57] ABSTRACT

A process of and apparatus for producing oxygen with a low fraction of argon from a gaseous medium like air, in which a gaseous medium is introduced into a first adsorption unit to produce an intermediate gas enriched with oxygen and depleted of argon. The intermediate gas is then supplied to a second adsorption unit in which the final product gas is prepared as well as a by-product which is returned into the process. Each of the adsorption units includes at least two adsorbers operating in a working cycle wherein the working cycle of the adsorbers of the second unit lasts about twice as long as the working cycle of the adsorbers of the first unit. For allowing an evacuation of each adsorber and thus a regeneration thereof, a common vacuum pump is connected to each unit in such a manner that the regeneration of the adsorbers of the second unit is temporarily interrupted when one of the adsorbers of the first unit is evacuated.

20 Claims, 3 Drawing Figures

PROCESS AND APPARATUS FOR PRODUCING OXYGEN WITH A LOW PROPORTION OF ARGON FROM AIR

FIELD OF THE INVENTION

Our present invention relates to a process and an apparatus for producing, by pressure-swing adsorption (PSA) from an oxygen-containing gaseous medium like atmospheric air, oxygen with a low proportion of argon.

BACKGROUND OF THE INVENTION

Pressure-swing adsorption is a technique which has gained increasing interest in recent years because it eliminates the need for thermal regeneration of an adsorber bed.

In pressure-swing adsorption, a gas mixture is passed through an adsorber bed which selectively retains a component of the gas mixture at a relatively high adsorption pressure which, although higher than a desorption pressure, may nevertheless not have a magnitude significantly greater than atmospheric pressure. Following the adsorption phase, which generally is carried out until just prior to breakthrough of adsorbed component, the adsorber is flushed in the flushing or purging phase with a purging gas, generally at the adsorption pressure. Subsequently the adsorber is subjected to a pressure reduction which may release a purging or flusing gas and then a product gas rich in the adsorbed component. This desorption phase is effected at a pressure which is below that of the adsorption phase.

Generally a number of such adsorbers, usually using molecular sieve adsorbents, will be provided and operated in a phase-shifted relationship so that communication between two adsorbers in different phases can allow pressure rebuilding in a desorbed adsorber in a pressure buil-up phase and at the same time the reduction of pressure in an adsorber in which adsorption has terminated. The generation of the flushing gas can be effected in a similar manner.

An expansion phase can follow the adsorption phase and precede the flushing and desorption phases.

Consequently a large number of adsorbers can be provided and the plant formed with the necessary valves and pipes interconnecting the adsorbers and which, when opened and closed, communicate between the adsorbers, with the product, waste gas and inlet gas lines, and with compressors and vacuum pumps which may be provided.

Oxygen having a purity of at least 99.5 vol. percent is required for a multitude of applications in the practice, e.g. in welding for gas cutting, or in medicine.

A common method of producing oxygen is the cryogenic rectification (fractionation) of air. This process is carried out at considerable capital cost so that from an energy point of view its application is interesting only in plants with high outputs.

When smaller consumers are concerned, oxygen is usually supplied in liquid form and stored, being drawn as needed via a cold water gasifier. This supply technique has, however, the drawback for the customer that the price of oxygen depends largely on transport costs, a factor especially relevant in countries with little industrialization. Moreover, such a supply can easily be jeopardized by, for example, bad traffic conditions, political instability etc.

German patent document—open application DE-OS No. 28 55 626 discloses a method for producing oxygen with a purity of above 99.5 vol. percent from gas mixtures containing $N_2$, $O_2$ and Ar.

This method is carried out in a pressure-swing adsorber system with carbon molecular sieves.

Preferably, the adsorption unit includes two adsorbent beds whose working cycles each comprise an adsorption phase and a desorption phase. The working cycles in both adsorbent beds are dephased relative to one another.

The adsorbent beds which are filled with the carbon molecular sieve provide during the desorption phase an intermediate product that is enriched with oxygen and depleted of argon by comparison to the supplied $N_2/O_2/Ar$ gas mixture.

Thereafter the intermediate product is subjected to zeolitic adsorption in an adsorption unit which also preferably includes two adsorbent beds and in which nitrogen is preferentially removed (while argon is not adsorbed). When this method is carried out with a dry and carbon-dioxide-free air, oxygen is produced with a purity of 99.7 vol. percent during the adsorption phase of the zeolitic adsorption unit.

Since the drying of the air is only optional and frequently is omitted, the amount of produced waste gases is greater at the cost of a smaller amount of product gas.

Moreover, the fractionation of the gas obtained during the desorption in the carbon adsorption unit requires two intermediate reservoirs for this gas. A further drawback of the known method resides in the necessity for large-volume adsorbers since the method is operated at normal pressure. Finally, the prior-art method requires the use of a vacuum pump for each stage, i.e. for the carbon adsorption unit and the zeolitic adsorption unit, thus rendering the method complicated and frequently uneconomical.

OBJECTS OF THE INVENTION

The principal object of our invention is to provide an improved process and apparatus for producing oxygen with a high purity from a gaseous medium like air.

Another object is to provide an improved method of recovering high-purity $O_2$, especially low in Ar, from air whereby the aforementioned disadvantages of the prior art as outlined above and otherwise are obviated.

Yet another object is to improve the aforementioned prior-art process so that one can obtain a larger output of $O_2$ at higher purity from air while reducing the waste-gas volume.

SUMMARY OF THE INVENTION

We realize these objects according to the present invention in a pressure-swing adsorption method as in the above-mentioned reference by providing a first adsorption unit for adsorbing oxygen from the gaseous medium to produce an intermediate gas enriched with oxygen and depleted of argon and having a working cycle which lasts half the time of the working cycle of a second adsorption unit during which nitrogen is removed from the intermediate gas to provide the product gas.

Surprisingly, we have found that the process can be performed by using just one vacuum pump which is connectable to both the first and second adsorption units. This means that evacuation or regeneration of the second adsorption unit must temporarily be interrupted when an adsorber of the first adsorption unit is evacuated.

We have found, put otherwise, that the zeolite-bed adsorbers should be operated in cycles that are twice the cycling time of the carbon-bed adsorbers and that the regeneration of the zeolite-bed absorbers is interrupted while the first of carbon-bed adsorbers are regenerated by a vacuum pump which is used in common to regenerate the adsorbers.

The second adsorption unit includes at least two adsorbers filled with a zeolitic molecular sieve. During the initial stage of regeneration of the adsorbers at normal pressure, a large amount of gas is drawn off with a considerable pressure decrease.

To regenerate the adsorbers sufficiently to produce pure oxygen during the subsequent adsorption phase, the desorption of sorbed molecules from the adsorbent must be as complete as possible. Although it has been shown that the desorption of these molecules is relatively difficult and requires a long evacuation period and low absolute pressure, we have found that—despite the occurring dead time which may last 1 to 2 minutes depending on the pressure in the adsorber of the second unit—the regeneration is sufficiently without adverse effect. The evacuation or regeneration of the adsorbers of the second unit in two stages with an intermediate dead time (corresponding to the interruption) provides a drawing off of gas in an amount essentially equal to the amount known in prior-art processes.

The use of only one vacuum pump and thus interrupted evacuation of the zeolitic molecular sieve has economical and energetic advantages. On the one hand, the energy consumption is decreased as a consequence of the reduced evacuation time, and, on the other hand, during the interruption of the regeneration, the vacuum pump can be used for other purposes.

According to a further feature of the invention, the adsorbers of the first unit which are filled with a carbon molecular sieve are operated at a pressure above the ambient pressure during the adsorption phase so that the period of evacuation obtained by the vacuum pump is reduced because the so-obtained expansion gas within the adsorber has a higher content of oxygen and a lower fraction of argon than air and thus is suitable to be processed in the subsequent zeolitic adsorption unit. At a pressure above 4 bar, the carbon molecular sieve adsorber contains at the end of the adsorption phase air occupying the idle volume (dead space and void volume) of the adsorber as well as oxygen-enriched gas within the molecular sieve granules. Consequently, when quickly expanding, a mixture of air and desorbed gas flows out of the adsorber during which outflow the concentration of oxygen will increase and the concentration of argon will decrease toward the end of the expansion so that the thus obtained gas can be supplied to the zeolitic adsorber during the following desorption stage.

For reasons described above, the use of only one common vacuum pump for the first and second adsorption units is advantageous. Moreover, we have to note that the amounts of gas provided by the carbon molecular sieve during expansion and evacuation is sufficient for charging the zeolitic molecular sieve. After evacuation of the adsorber of the first unit once half of the working cycle has passed, a sufficiently low remaining charge of the adsorbent is provided in order to allow production of an oxygen-enriched and argon-depleted gas during the following adsorption phase. Likewise, the remaining charge of the zeolitic adsorber is sufficiently low after the evacuation in two stages so that, during the following adsorption, an essentially nitrogen-free gas leaves the adsorber.

According to yet another feature of the invention, a drying unit is integrated into the process for drying the supplied gas medium before entering the first adsorption unit. The provision of the drying unit provides extremely pure oxygen in a large amount of product gas.

It may be mentioned that the interruption for periods of 1 to 2 minutes in the regeneration by the vacuum pump does not have a detrimental effect in part because the pressure in the adsorber can be dropped from about 1 bar to a value below 100 mbar in less than 1 minute of the desorption phase. During the interruption the pressure rise in this adsorber is small, generally below 20 mbar. During this pressure increase there is little change with respect to further desorption as is evidenced by the fact that a further evacuation for, say, 1 minute, yields only a small amount of additional gas over the evacuated flow with the interruption.

The apparent very slow desorption of a zeolitic molecular sieve is surprising in view of the highly rapid substantially complete desorption or regeneration of a carbon molecular sieve which requires only a fraction of the time. The fact that the evacuation of the zeolitic adsorber can be interrupted without detriment to its desorption for a period sufficient to allow the single vacuum pump to desorb a carbon molecular sieve has the twin advantages of reducing the evacuation work and enabling the pump to be used otherwise.

The vacuum pump can, for example, during an interruption in the regeneration of a zeolite adsorber be connected to other adsorbers to evacuate them, the evacuated gases being discarded or recycled.

Preferably, however, gases evacuated from a carbon-bed adsorber can be admitted to a zeolite-bed adsorber which is not then being regenerated.

If the adsorbers of the zeolite stage are only charged with a gas produced during evacuation of the carbon molecular sieve stage, the charging can only be effected during the interruption of the regeneration of another zeolite bed. Charging, therefore, can have two dead times.

Surprisingly, according to the invention, the pressure-swing adsorption is carried out with respect to the carbon molecular sieve adsorber so that an expansion gas is produced which has, by comparison with air, a significantly higher $O_2$ level and a low Ar content and which is especially suitable for processing in the zeolite stage.

This gas can, however, only be obtained when the carbon molecular sieve adsorber is charged at a pressure above ambient atmospheric pressure.

At a pressure above 4 bar the carbon molecular sieve adsorber at the end of the charging phase contains air in the free space (dead space and particle interstitial volume) as well as an oxygen-enriched gas in the molecular sieve particles. During the rapid expansion step a mixture of air and desorbed gas flows from this adsorber. The concentration of the oxygen increases and that of argon falls toward the end of expansion so that this gas is especially amenable to processing in the zeolite stage.

It is indeed surprising, considering the fact that only one vacuum pump common to both regenerations is required according to the invention that:

the gas quantity twice drawn from the carbon molecular sieve during expansion and evacuation is sufficient to charge the zeolite molecular sieve;

the residual charge in the carbon molecular sieve adsorber after evacuation over the half-cycle time is sufficiently low that sufficient quantity of $O_2/Ar$ can nevertheless be subsequently adsorbed and thereafter supplied to the zeolite stage; and the residual charge in the zeolite adsorber is, in spite of the interruption, sufficiently low that during the next charge a practically nitrogen-free gas leaves the adsorber.

BRIEF DESCRIPTION OF THE DRAWING

The above and other objects, features and advantages of our present invention will be described in greater detail with reference to the accompanying drawing in which:

FIG. 3 is a control diagram of the apparatus according to FIGS. 1 and 2.

DESCRIPTION OF THE PREFERRED EMBODIMENT

Figure 1:
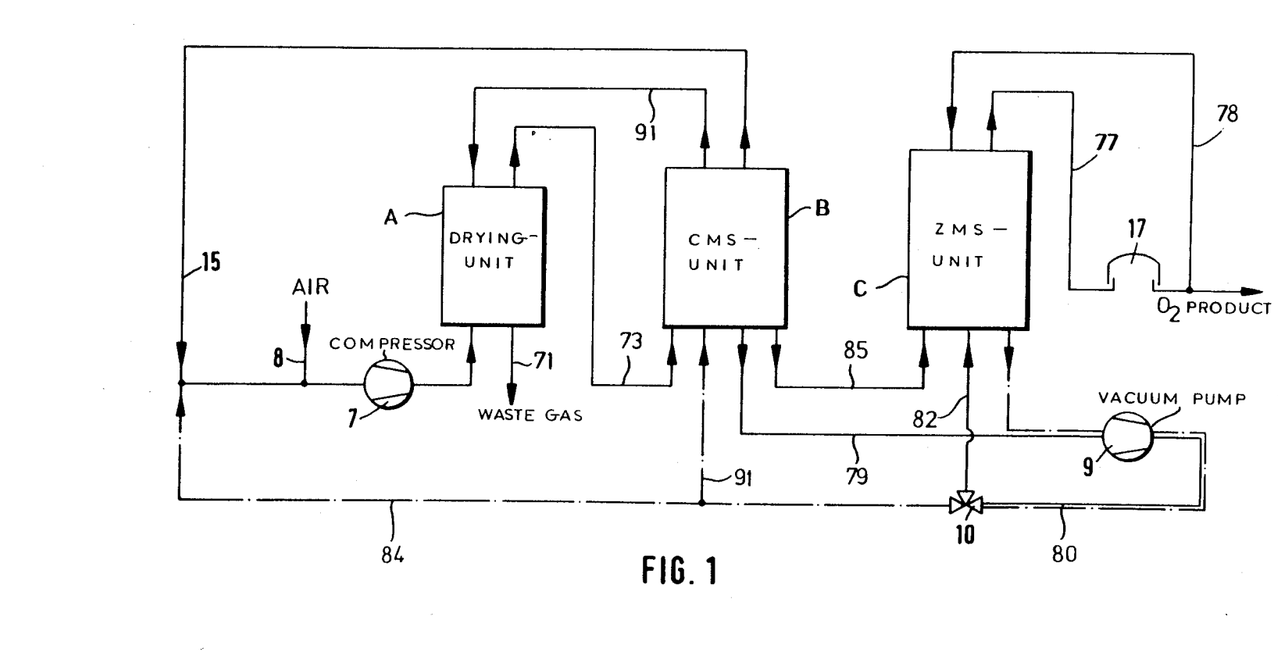
FIG. 1 is a simplified flow diagram of an apparatus according to the invention including a drying unit integrated with the carbon-molecular sieve unit for obtaining an especially high output of high-purity oxygen from air.

Referring firstly to FIG. 1 in which a flow diagram for producing pure oxygen is illustrated, it may be seen that the system includes in general three distinct units A, B, C, that is a drying unit A, a carbon molecular sieve B (CMS-unit) and a zeolite molecular sieve C (ZMS-unit).

The drying unit A contains an absorbent for $H_2O$ while an $O_2/Ar$ adsorbent carbon molecular sieve coke is used for the CMS-unit B and zeolite 13X is used for Ar adsorbent of the ZMS-unit C. Connected to the drying unit A is a compressor 7 which communicates with a line 8 through which air is supplied and with a line 15 through which exit gas leaving the CMS-unit B is introduced into the process.

This arrangement integrates a pressure-swing drying in the $O_2$ production process at a minimum cost. The drying unit is regenerated in the expanded state (at ambient pressure) using as the flushing or purge gas a waste gas from the carbon adsorption unit into which the dried gas mixture is fed.

In the carbon molecular sieve unit, oxygen is preferentially adsorbed. The $O_2$-enriched gas desorbed from the carbon molecular sieve is passed into the zeolite stage where $N_2$ is preferably adsorbed and high-purity $O_2$ *passed as the product.*

The gas flowing through line 15 is slightly enriched with oxygen and depleted of argon. Via line 73, the dryer A communicates with the CMS-unit B so that dried gas leaving the dryer A is supplied to the CMS-unit B.

The dryer A is further connected to a line 71 for allowing waste gas to be discharge. Connected to the CMS-unit B via line 79 is a vacuum pump 9 which conveys gas enriched with oxygen and depleted of argon to the ZMS-unit C via a three-way valve 10 and lines 80 and 82 and which is also directly connectable with the ZMS-unit C for forcing a by-product gas obtained in the latter to be used for building up pressure in the CMS-unit B (via line 91) or to be returned to line 15 via line 84 and thus be reintroduced into the process. Via line 85, the CMS-unit B is directly connected to the ZMS-unit C which is further in communication with a pressure build-up reservoir 17 containing pure oxygen supplied via line 77. By recycling pure oxygen via line 78, the pressure in the ZMS-unit C can be increased.

The apparatus according to the invention operates in principle as follows:

A mixture of moist air supplied via line 8 and waste gas enriched with oxygen and depleted of argon and supplied via line 15 is introduced via the compressor 7 into the dryer A.

In the dryer A, water vapor whose fraction within the mixture has already been reduced through the compression is removed. The drying or dehumidification of the gas can thus easily be integrated into the process.

After being dried, the gas mixture is introduced into the CMS-unit via line 73 for providing an intermediate gas enriched with oxygen and depleted of argon. By using the exit gas leaving the CMS-unit B via line 91 as flushing gas, the dryer-unit A is regenerated when being in a relaxed state (at ambient pressure). The intermediate gas provided in the CMS-unit B is then fed into the ZMS-unit C to produce a product gas containing above 99.5 volume percent of oxygen.

The apparatus according to the invention thus provides three flows of exit or waste gas. A first exit gas flow which contains primarily nitrogen and argon and has a relatively low content of oxygen is used as flushing gas for regenerating the dryer A via line 91. The other exit gas flows contain a higher amount of oxygen and less argon in comparison to air and include a second flow conveyed by vacuum pump 9 from the ZMS-unit C via lines 80, 84 and valve 10 to the return line 15 and a third flow obtained during expansion in concurrent flow from the CMS-unit B to the return line 15. By using the various exit flows, the efficiency of the system is increased and especially by returning the exit gas flows into the line 15, a gas mixture is introduced into the adsorption units which already has a higher content or oxygen and reduced fraction of argon in comparison to air.

Figure 2:
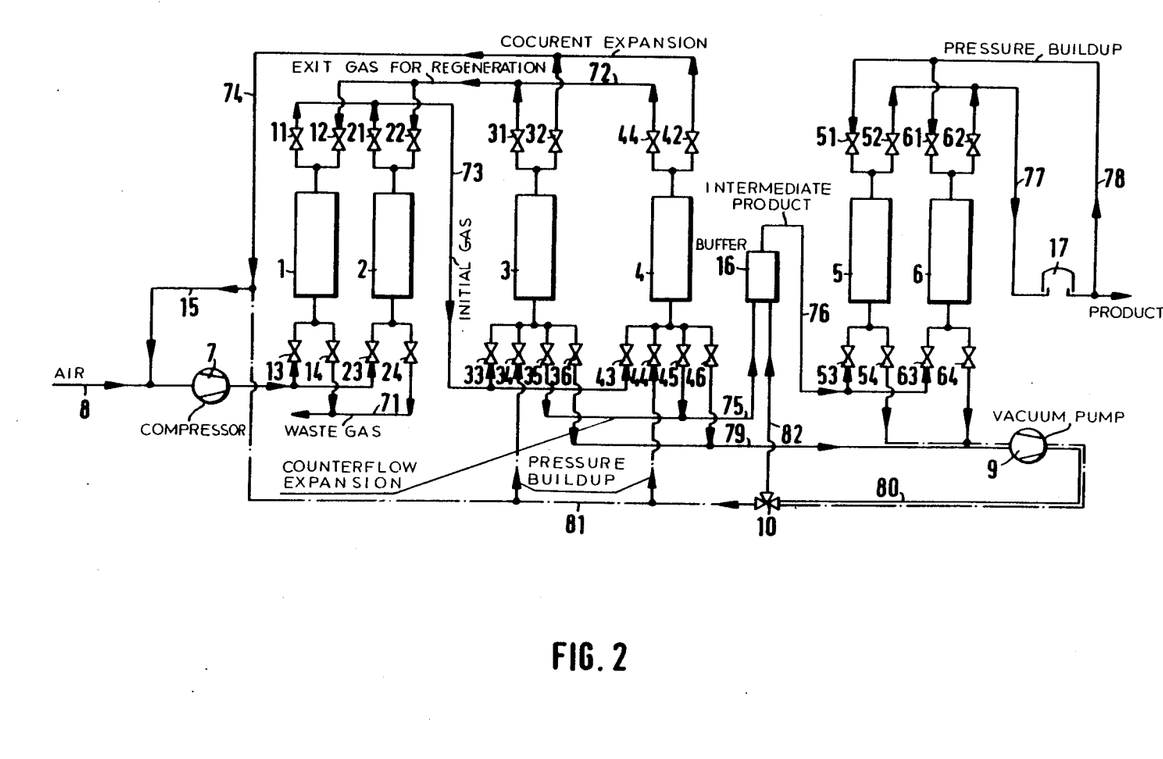
FIG. 2 is a detailed illustration of the apparatus according to FIG. 1.

We turn now to FIGS. 2 and 3 which show the apparatus as well as its operation in more detail.

The drying unit A includes two adsorbers 1, 2 each filled with an adsorbent for drying the introduced gas mixture. The CMS-unit B for oxygen enrichment and argon depletion of the dried gas mixture includes two adsorbers 3, 4 which contain a carbon molecular sieve while the ZMS-unit C for removing nitrogen from the introduced gas mixture has two adsorbers 5, 6 containing a zeolitic molecular sieve. Arranged between the adsorbers 3, 4 and adsorbers 5, 6 is a buffer container 16.

Each of the adsorbers 1, 2 is connected to the compressor 7 via a valve 13, 23, respectively. The valves 13, 23 are alternatingly opened, i.e. when e.g. valve 13 is opened, a drying can take place in adsorber 1 while valve 23 is closed to allow regeneration of the adsorber 2 via valve 24 which is thus open as long as valve 13 is open and controls the flow of waste gas through line 71. Valve 14 controls the regeneration of adsorber 1 and is thus put in the open state when drying takes place in adsorber 2 while valve 13 is then closed. Each of the adsorbers 1, 2 is further connected to two more valves 11, 12 and 21, 22 which control the flow from the adsorbers 1, 2 to the adsorbers 3, 4 via line 73 and respective valve 33, 43 and the flow from the adsorbers 3, 4 to the adsorbers 1, 2 via respective valves 31, 41.

The adsorbers 3, 4 are each connected to a valve 32, 42 which control the return of exit gas from the associated adsorbers 3, 4 via line 74 to the return line 15. The exit gas is then mixed with incoming air supplied via line 8 and reintroduced by the compressor 7 to either one of the adsorbers 1 or 2 depending on which one is drying. The direct connection between the adsorbers 3, 4 with the adsorbers 5, 6 of the ZMS-unit is provided via lines 75, 76 (correspond to line 85 in FIG. 1) and is controlled by valves 35, 45 and valves 53, 63. For allowing the by-product obtained in the adsorbers 5, 6 to be used as build-up gas for the CMS-unit B, valves 54, 64 are used which are open when the vacuum pump 9 is operated to evacuate the respective adsorber 5, 6 and to force the by-product via associated valves 34, 44. The vacuum pump 9 is further connectable to the adsorbers 3, 4 via line 79 through which intermediate gas enriched with oxygen and depleted of argon flows from the respective adsorber 3, 4 through the associated valve 36 or 46. Since only one vacuum pump 9 is utilized to pump gas from the adsorbers 3, 4 to the adsorbers 5, 6 and to pump gas from the adsorbers 5, 6 to the adsorbers 3, 4 (for pressure build-up) or back to line 15, a three-way valve 10 is provided to regulate the flow.

The discharge of the product gas from the adsorbers 5, 6 to the pressure build-up reservoir 17 via line 77 is controlled by valves 52, 62. Valves 51, 61 are respectively open when the pressure within the associated adsorber 5, 6 is to be built up. Consequently, a line 78 provided which connects the reservoir 17 with the adsorbers 5, 6 via the associated valve 51 or 61.

The mode of operation of the apparatus is very complicated since—as will now be explained—the gas produced in each process step is obtained in a different manner. While the dried gas mixture leaves the dryer A during the adsorption phase, the gas enriched with oxygen and depleted or argon leaves the CMS-unit B during the desorption phase, and the removal of nitrogen in the ZMS-unit C occurs during the adsorption phase. The selection of the working cycle of the pressure change drying does not depend on the operation of the subsequent adsorbers 3, 4, 5, 6 and is thus choosable in arbitrary manner as long as the requirements for the dehumidification and a continuous supply of dried gas are met. The CMS-unit B and the ZMS-unit C are synchronized upon each other in such a manner that two cycles occur in the CMS-unit B while only one cycle occurs in the ZMS-unit C.

Since the adsorbers 1 and 2, 3 and 4, 5 and 6 as well as the group of valves 11 to 14 and 21 to 24, 31 to 36 and 41 to 46, and 51 to 54 and 61 to 64 correspond to each other in their function, the mode of operation will be described in connection with only one of the adsorbers of the respective unit with the associated valves.

Reference may be had to the timing diagram of FIG. 3 in which the open valves are indicated by an X in the relevant box for the relevant phase of the cycle.

Assuming that drying occurs at first in adsorber 1 while adsorber 2 is subjected to a regeneration, a gas mixture containing air from line 8 and gas enriched with oxygen from return line 15 and whose pressure is increased by compressor 7 is supplied to adsorber 1. Consequently, valve 13 is open and valve 14 is closed. Simultaneously, valve 11 is open to allow the dried gas to flow via line 73 and via open valve 33 into the adsorber 3. While drying occurs in adsorber 1, regeneration is provided in adsorber 2. Accordingly, valve 24 is open (valve 23 is closed) to allow waste gas to be discharged through line 71. Simultaneously, valve 22 is open (valve 21 is closed) to allow exit gas to flow from one of the adsorbers 3, 4 into the adsorber 2 so that the pressure drop and flushing within adsorber 2 simultaneously occur. The flushing thus is obtained with dried gas from the process and provided at high pressure so that, during the regeneration or expansion within the adsorber 2, gas is discharged only through valve 24. After a predetermined period, the flushing is terminated after which the drying step occurs while adsorber 1 is regenerated.

As already mentioned, the dried gas is supplied via line 73 and open valve 33 and flows past the adsorbent bed of adsorber 3 so that oxygen is removed (phase 6+7). At the start of this phase, normal pressure prevails in the adsorber 3 which pressure increases to an adsorption pressure of above 4 bar during the passage of the gas. The increase of the pressure within the adsorber is controlled by an adjustable throttle (not shown) arranged behind the valve 31. The gas leaving the adsorber 3 is depleted of oxygen and flows via open valve 31 to the adsorber 1 or 2 depending on which is to be regenerated. After a certain period, valve 33 is closed and the adsorption occurring in adsorber 3 is stopped.

Once adsorption is stopped, valve 32 is opened to allow a cocurrent expansion (CCE) of the gas which is at adsorption pressure within the adsorber 3 (phase 8) while valves 31, 33 to 36 are closed. This gas is only slightly enriched with oxygen and flows via line 74 to the return line 15 so as to be reintroduced into the process. The cocurrent expansion is stopped after a predetermined period and when within the adsorber 3 an end pressure is obtained between the adsorption pressure and the ambient pressure. This procedure leads to an especially high enrichment of oxygen upon simultaneous very low fractions of argon during the subsequent steps.

Following the cocurrent expansion is the desorption phase which provides oxygen-enriched gas and includes two phases (phase 9+10 and 11+12). In the first phase, the counterflow expansion (CFE) takes place (phase 9+10). Accordingly, valve 35 is opened and the obtained intermediate gas enriched with oxygen and depleted of argon is directed via line 75, buffer container 16, line 76 and open valve 53 or valve 63 into the adsorber 5 or 6 of the ZMS-unit C. During the counterflow expansion, the pressure within the adsorber 3 decreases from the end pressure after cocurrent expansion to the ambient pressure. Once the counterflow expansion is terminated, the second phase of the desorption takes place (phase 11+12). Thus, after valve 35 has been closed, valve 36 is open and vacuum pump 9 is operated to evacuate adsorber 3 so that gas is drawn out of the adsorber 3 via line 79 and pumped via line 80, valve 10, line 82, buffer 16 and line 76 into one of the adsorbers 5 or 6 of the ZMS-unit C. We may note that this gas has an even higher content of oxygen and an even lower fraction of argon than the gas released during the counterflow expansion.

After evacuation, the pressure is increased within the adsorber 3 to normal pressure (PI). The gas required for the build-up in the adsorber 3 is provided by the ZMS-unit C during one of the evacuation phases of the adsorbers 5, 6. Accordingly, valve 54 is opened (phase 13) so that a gas having a higher oxygen content than the gas provided by compressor 7 is drawn out by the vacuum pump 9 and is supplied via line 80, valve 10, line 81 and valve 34 into the adsorber 3. In case more gas is drawn out of the adsorber 6 as is required to increase the pressure to normal within the adsorber 3, the gas is conveyed to line 15 and returned into the process. Thereafter, the next cycle can start beginning with the adsorption (phase 14+15).

The adsorbers 3 and 4 are so synchronized with each other that the ZMS-unit C is continuously fed with oxygen-enriched gas. Consequently, the desorption phases (counterflow expansion and evacuation) of one adsorber follows immediately the desorption phases of the other adsorber, as can be clearly seen from FIG. 3.

As already mentioned, the ZMS-unit C provides the removal of residual nitrogen from the gas mixture without adsorbing argon. In order to provide a continuous production of pure oxygen with a low fraction of argon, each adsorber 5, 6 of the ZMS-unit C has a working cycle which is twice as long as the working cycle of the adsorbers 3, 4, i.e. that the adsorption period as well as the regeneration period of each adsorber 5 or 6 takes the same time as an entire pressure change cycle of the adsorbers 3, 4 (e.g. phase 1 to 8).

Charging the ZMS-unit is provided in such a manner that the adsorber 5 is first filled with pure oxygen—provided by the pressure build-up reservoir 17 via line 78—to a pressure corresponding to the ambient pressure and is then traversed by intermediate gases obtained during a full cycle of the CMS-unit. After a predetermined period which depends on the length of the entire pressure change cycle of the respective adsorbers 3, 4 of the CMS-unit, charging of the adsorbers 5 or 6 with intermediate gases from the CMS-unit is stopped. Charging is terminated prior to nitrogen breakthrough at the adsorber 5. Consequently, during charging, oxygen-enriched gas flows through line 76 and via valve 53 into the adsorber 5 and pure oxygen leaves the adsorber 5 via valve 52 and line 77.

Once adsorption of adsorber is terminated, the vacuum pump 9 is operated to provide a regeneration thereof. Since, however the pump 9 is also used to evacuate the adsorbers 3 and 4, regeneration of adsorbers 5 and 6 is only possible when one of the adsorbers 3, 4 is subjected to an evacuation. Therefore, the evacuation (or desorption) of adsorbers 5, 6 must temporarily be interrupted and is thus divided into two stages. Between those two evacuating stages, a dead time is obtained during which none of the valves 51 to 52 or 61 to 64 of the adsorber 5 or 6, depending on which is to be regenerated, is open. The duration of each dead time corresponds to the duration of the evacuation phase of the adsorbers 3 or 4 (see FIG. 3). We have found that the dead time, i.e. the time during which no evacuation of the respective adsorber 5 or 6 occurs as the vacuum pump is used for evacuation of the respective adsorber of the CMS-unit, can amount to 1 to 2 min. without essentially affecting the regenerating of the adsorbent when the pressure in the adsorber is reduced within 1 minute from 1 bar to a magnitude below 100 mbar during the first phase of the evacuation. Once the vacuum pump 9 is disconnected, an increase of the pressure in the adsorber is obtained which remains, however, below 20 mbar and is ascribed to the desorption of molecules. After the dead time, i.e. after termination of the evacuation phase of the respective adsorber 3 or 4, valve 54 is opened to continue evacuation of e.g. adsorber 5.

The by-product gas drawn off the adsorber 5 by the vacuum pump 9 and used for build-up of pressure within the respective adsorber 3, 4 contains more oxygen than the initial gas introduced through the compressor 7 so that its reuse is advantageous.

EXAMPLE

In the following the invention is illustrated with reference to the following example:

As initial gas, air is used having a relative humidity of 65%, a temperature of 23° C. and a pressure of 1010 mbar.

In the dryer A silica gel is used as adsorbent in a volume of 94 l at a working pressure for the dehumidification of 8.0 bar and for the regeneration of 1025 mbar, and a cycle time of 7.5 min.

In the CMS-unit B carbon molecular sieve coke CMSN2 is used in a volume of 94 l at a working pressure for the adsorption of 7.95 bar and for the evacuation of 40 mbar, and a cycle time of 1.5 min. During a pressure change cycle (phase 1 to 8 or 9 to 16) of the respective adsorber 3 and 4, gases of the following composition have been received:

| | | |
|---|---|---|
| (a) | the gas discharged from the adsorbers 3 and 4 and used for regenerating the adsorbers 1 and 2 has | 14.5 vol.-% $O_2$, 1.2 vol.-% Ar |
| (b) | the gas during cocurrent expansion has | 28.0 vol.-% $O_2$, 0.7 vol.-% Ar |
| (c) | the gas during counterflow exapnsion and evacuation has | ∅ 72 vol.-% $O_2$, 0.28 vol.-% Ar |

The adsorbent in the ZMS-unit C is zeolith 13X in a volume of 125 l at a working pressure for the adsorption of 1.2 bar and for the evacuation of 40 mbar, and a cycle time of 3 min.

In the respective adsorber 5 and 6, gases of the following composition have been obtained:

| | | |
|---|---|---|
| (d) | the gas leaving the CMS-unit during counterflow expansion and evacuation (intermediate product) | 72 vol.-% $O_2$, 0.28 vol.-% Ar |
| (e) | the product gas | 99.6 vol.-% $O_2$, 0.4 vol.-% Ar |
| (f) | the gas obtained after evacuation of adsorber 5 or 6 | 64 vol.-% $O_2$, 0.25 vol.-% Ar |

We claim:

1. A process for producing oxygen with a low proportion of argon from air, comprising the steps of:
   adsorbing oxygen from the air by allowing the latter to flow past a first adsorption unit;
   desorbing the sorbed oxygen under formation of an intermediate gas enriched with oxygen and depleted of argon and including evacuating of the adsorption unit;
   adsorbing nitrogen from the intermediate gas by allowing the latter to flow past a second adsorption unit to obtain a product gas further enriched with oxygen; and
   desorbing the removed nitrogen from the second adsorption unit under formation of a by-product gas by evacuating the second adsorption unit, said second adsorbing and desorbing step defining a working cycle lasting twice as long as the working cycle defined by said first adsorbing and desorbing step wherein said evacuation step of said second adsorption unit is temporarily interrupted when said evacuating step of the first adsorption unit occurs.

2. A process as defined in claim 1 wherein said first adsorbing step includes allowing the gaseous medium to flow past the adsorption unit until an adsorption pressure above the ambient pressure prevails in the first adsorption unit and discharging an exit gas containing more oxygen and less argon than the gaseous medium by allowing the gas to expand once the adsorption pressure has been build-up and to be returned into the process until an end pressure is obtained between the adsorption pressure and the normal pressure within the first adsorption unit.

3. A process as defined in claim 1 wherein said adsorption pressure is above 4 bar.

4. A process as defined in claim 2 wherein said first desorbing step includes expanding a first portion of the intermediate gas from said first adsorption unit by allowing it to flow to the second adsorption unit until the end pressure decreases to normal pressure.

5. A process as defined in claim 1 wherein said second desorbing step includes returning the by-product obtained during evacuating of the second adsorption unit and being enriched with oxygen and depleted of argon back into the process.

6. A process as defined in claim 5 wherein said returning step includes directing the by-product into the first adsorption unit for a pressure build-up therein.

7. A process as defined in claim 1, and further comprising drying the gaseous medium in a drying unit prior to said first adsorbing step.

8. A process as defined in claim 7, and further comprising regenerating the drying unit while being in a relaxed state by introducing into the drying unit an exit gas obtained during said first adsorbing step.

9. A process as defined in claim 2, and further comprising compressing the gaseous medium prior to said first adsorbing step.

10. A process as defined in claim 9 wherein said discharging step includes returning the exit gas obtained during its expansion out of the first adsorption back into the process prior to the compressing step.

11. A process as defined in claim 1 wherein said regenerating step includes an interruption of the evacuation of the adsorber of the second adsorption unit over a period between 1 and 2 minutes depending on the pressure prevailing in the adsorber of the second adsorption unit.

12. An apparatus for producing oxygen with a low fraction of argon from air, comprising:
a first adsorption unit having at least two adsorbers for treating the air to provide an intermediate gas enriched with oxygen and depleted of argon, each of said adsorbers operating in a working cycle having an adsorption phase and a desorption phase;
a second adsorption unit having at least two adsorbers connected to said first adsorption unit for removing nitrogen from said intermediate gas so as to provide a further enrichment with oxygen, each of said adsorbers of said second adsorption unit operating in a working cycle which has an adsorption phase and a desorption phase and which lasts twice as long as the working cycle of said adsorbers of said first adsorption unit; and
a vacuum pump cooperating with each of said adsorbers of said first adsorption unit for evacuating said adsorbers of said first adsorption unit, and cooperating with each of said adsorbers of said second adsorption unit for regenerating said adsorbers of said second adsorption unit, said vacuum pump cooperating with said first and second adsorption units such that regeneration of said adsorbers of said second adsorption unit is temporarily interrupted when evacuation of one of said adsorbers of said first adsorption unit is provided.

13. Apparatus as defined in claim 11, further comprising a drying unit connected to said first adsorption unit and being provided to dehumidify the gaseous medium before entering said first adsorption unit, said drying unit cooperating with said first adsorption unit such that an exit gas leaving the first adsorption unit after the gaseous medium is depleted of oxygen is returned into said drying unit for regenerating the latter when being in a relaxed state.

14. Apparatus as defined in claim 11 wherein said first adsorption unit is a carbon molecular sieve.

15. Apparatus as defined in claim 11 wherein said second adsorption unit is a zeolitic molecular sieve.

16. In a method of operating a pressure-swing-adsorption plant for the recovery of high purity oxygen from air in which
a first carbon molecular sieve adsorption unit having at least two beds and a second zeolite molecular sieve adsorption unit having at least two beds are provided in tandem and each of said beds is operated in a working cycle having a charging phase and a desorption phase,
from the first adsorption unit an intermediate product gas is obtained with a higher oxygen content and lower argon content than the air during the respective desorption phase and is fed to said second adsorption unit,
a final product gas is recovered from the second adsorption unit during the charging phase thereof which has its oxygen content increased over that of said intermediate product gas and from which nitrogen has been removed, and
a by-product gas is recovered from the second adsorption unit in said desorption phase thereof,
the improvement wherein:
(a) the beds of said second adsorption units are cycled through the working cycles thereof with cycle times twice that of the working cycles of the beds of the first adsorption unit;
(b) the desorption phase of each bed of said second adsorption unit is effected by evacuating same and the evacuation is interrupted during the desorption phase of the beds of said second adsorption unit; and
(c) a common vacuum pump is selectively connected to the beds of both units for desorbing same during the respective desorption phases.

17. The improvement defined in claim 16, further comprising the steps of:
recovering a waste gas having a higher oxygen content and a lower argon content than air from at least one of said units; and
recycling said waste gas to said first adsorption unit for mixture with air as a feed gas during a charging phase of said first adsorption unit.

18. The improvement defined in claim 16, further comprising the steps of:
connecting to said first adsorption unit a pressure-swing drying unit;

regenerating said drying unit in an expanded state thereof with a waste gas from said first adsorption unit; and feeding dry air from said drying unit as feed gas to said first adsorption unit.

19. The improvement defined in claim 17, further comprising the steps of:

connecting to said first adsorption unit a pressure-swing drying unit;

regenerating said drying unit in an expanded state thereof with a waste gas from said first adsorption unit; and feeding dry air from said drying unit as feed gas to said first adsorption unit.

20. The improvement defined in claim 19 wherein the waste gas fed to said drying unit is withdrawn from said first adsorption stage during an expansion thereof in the same direction as charging flow therethrough and is fed to said drying unit through a compressor until a pressure is generated in said first adsorption phase between the charging pressure thereof and ambient pressure.

* * * * *